United States Patent [19]

Duh

[11] Patent Number: 5,449,701

[45] Date of Patent: Sep. 12, 1995

[54] SOLID STATE POLYMERIZATION PROCESS FOR FOAMED POLY(ETHYLENE NAPHTHALATE)

[75] Inventor: Ben Duh, Tallmadge, Ohio

[73] Assignee: Shell Oil Company, Houston, Tex.

[21] Appl. No.: 357,619

[22] Filed: Dec. 15, 1994

[51] Int. Cl.⁶ .............................................. C08G 63/88
[52] U.S. Cl. .................... 521/182; 528/272; 528/298; 528/483; 528/502 R; 528/503
[58] Field of Search ............... 521/182; 528/272, 298, 528/483, 502, 503

[56] References Cited

U.S. PATENT DOCUMENTS

| | | |
|---|---|---|
| 3,586,647 | 6/1971 | Kremer . |
| 4,755,587 | 7/1988 | Rinehart . |
| 4,849,497 | 7/1989 | Scannapieco ................... 521/182 |
| 4,876,326 | 10/1989 | Rinehart ....................... 528/272 |
| 4,917,845 | 4/1990 | Cohn ............................. 521/64 |
| 4,957,945 | 9/1990 | Cohn ............................. 528/272 |
| 4,963,644 | 10/1990 | Duh . |
| 4,977,196 | 12/1990 | Scannapield ................... 521/182 |
| 5,225,448 | 7/1993 | Maier et al. .................... 528/272 |

*Primary Examiner*—Morton Foelak
*Attorney, Agent, or Firm*—Denise Y. Wolfs

[57] ABSTRACT

This invention includes a process for preparing a solid state polymerized poly(ethylene naphthalate)or PEN polymer comprising: (1) preparing a molten PEN polymer with an intrinsic viscosity of from about 0.25 dl/g to about 0.55 dl/g, (2) dispersing an inert gas into the molten PEN polymer to form a foamed PEN polymer with a void fraction of from about 0.10 to about 0.50, (3) forming the foamed PEN polymer into granules, (4) devolatilizing the granular PEN polymer at a temperature of from about 80° C. to about 140° C., (5) crystallizing the devolatilized PEN polymer at a temperature of from about 150° C. to about 260° C., and (6) solid state polymerizing the crystallized PEN polymer at a temperature of from about 235° C. to about 265° C. to form a solid state polymerized PEN product.

16 Claims, No Drawings

SOLID STATE POLYMERIZATION PROCESS FOR FOAMED POLY(ETHYLENE NAPHTHALATE)

FIELD OF THE INVENTION

This invention relates to a process for solid state polymerizing poly(ethylene naphthalate), specifically applicable to a foamed poly(ethylene naphthalate) prepolymer.

BACKGROUND OF THE INVENTION

High molecular weight polyesters are commonly produced from low molecular weight polyesters of the same composition by solid state polymerization. The low molecular weight polyesters which are used in such solid state polymerizations are generally prepared by conventional melt polymerization. The molten polyester product of such melt polymerizations is convened to solid granules in the shape of pellets, chips, or cubes. Solid state polymerization of such pellets, chips, or cubes is generally considered advantageous in that the handling of high molecular weight ultra-high viscosity molten polymers is eliminated. Thermal degradation is also essentially avoided during the solid state portion of the polymerization.

Solid state polymerization of a polyester involves two major steps: chemical reaction and diffusion of reaction byproducts, e.g. water and ethylene glycol. Therefore, the solid state polymerization rate can be increased by reducing the diffusional resistance within the prepolymer granules. The diffusional resistance can be reduced by reducing the prepolymer particle size. However, smaller granules have higher tendencies to stick together during solid state polymerization, causing process difficulties. Therefore, there exists a minimum particle size that is suitable for solid state polymerization.

Several methods have been proposed to reduce diffusional resistance while maintaining a suitable particle size. U.S. Pat. No. 3,586,647 (Kremer) proposes foamed pellets which are formed by dispersing nitrogen or a foaming agent into the prepolymer melt before pelletizing. We have found that the improvement in the solid state polymerization rate of poly(ethylene terephthalate) (PET) by using foamed pellets is only between 20 and 35%. Because the cells within the foamed pellets are closed, the improvement in the solid state polymerization rate through use of foamed pellets will be somewhat limited. U.S. Pat. No. 4,755,587 (Rinehart) proposes porous pellets with interconnected voids. Porous PET pellets solid state polymerize 2 to 3 times as fast as standard solid PET pellets. Since the voids inside each porous pellet are interconnected, a great improvement in the solid state polymerization rate can be achieved by using porous pellets. Although porous pellets offer greatly improved solid state polymerization rates, the formation of porous pellets involves expensive operations-grinding, compacting, and classifying, etc.—and porous pellets tend to generate large amounts of fines, which impacts productivity.

Because of its high strength and barrier properties, poly(ethylene naphthalate) (PEN) is an excellent material for the applications of beverage and food containers and industrial fibers. Due to its extremely high melt viscosity, PEN with an intrinsic viscosity suitable for such applications cannot be produced by melt state polymerization process alone. Instead, it must be produced by a combination of melt state and solid state polymerization processes. Because of the high barrier properties of PEN, the solid state polymerization rate is relatively slow. It is also known that PEN is preferably devolatilized prior to solid state polymerization, as described in U.S. Pat. No. 4,963,644 (Duh).

We have discovered that the solid state polymerization rate of PEN can be dramatically improved by using foamed PEN prepolymer granules. The magnitude of this rate improvement is surprisingly unexpected, even in view of the known improvement that results when foamed PET is solid state polymerized. In our investigation of the solid state polymerization rate of foamed PEN granules, we found that the solid state polymerization rate improvement by foamed PEN granules over standard solid PEN granules was surprisingly high—exceeding even the solid state polymerization rate improvement by porous PET granules over the standard solid PET granules, if the foamed PEN granules are devolatilized prior to crystallization and solid state polymerization. The use of a foamed PEN prepolymer, combined with a devolatilization step prior to solid state polymerization, provides a particularly fast and productive solid state polymerization process for a PEN polymer.

SUMMARY OF THE INVENTION

This invention includes a process for preparing a solid state polymerized PEN polymer comprising: (1) preparing a molten PEN polymer with an intrinsic viscosity of from about 0.25 dl/g to about 0.55 dl/g, (2) dispersing an inert gas into the molten PEN polymer to form a foamed PEN polymer with a void fraction of from about 0.10 to about 0.50, (3) forming the foamed PEN polymer into granules, (4) devolatilizing the granular PEN polymer at a temperature of from about 80° C. to about 140° C., (5) crystallizing the devolatilized PEN polymer at a temperature of from about 150° C. to about 260° C., and (6) solid state polymerizing the crystallized PEN polymer at a temperature of from about 235° C. to about 265° C. to form a solid state polymerized PEN product. The subject invention also includes the product of this process, and a method for obtaining a PEN polymer with a reduced melting point.

DETAILED DESCRIPTION OF THE INVENTION

The PEN prepolymer utilized in accordance with the present invention is typically prepared by standard melt polymerization techniques. Such melt polymerizations result in the formation of PEN which is essentially amorphous in nature. By this we mean that the PEN is virtually totally amorphous even though it may contain small regions where crystallinity exists. The PEN homopolymer is generally produced by melt polymerizing ethylene glycol with an alkyl diester of a naphthalene dicarboxylic acid, such as dimethyl-2,6-naphthalene dicarboxylate. Alternatively, the PEN is produced by polymerizing ethylene glycol with a naphthalene dicarboxylic acid monomer, such as 2,6-naphthalene dicarboxylic acid.

The PEN utilized in this invention can be a modified PEN. A modified PEN, or PEN copolymer, contains small amounts of repeat units which are derived from acids other than naphthalene dicarboxylic acid and/or glycols other than ethylene glycol. For instance, small amounts of isophthalic acid or terephthalic acid can be used in the diacid component utilized in preparing the PEN. PEN which has been modified with a small amount of a diol containing from 3 to 8 carbon atoms is also representative of a modified PEN which can be used. For instance, a small amount of 1,4-butane diol can be utilized in the glycol component used in preparing the modified PEN. Normally, no more than about 20 mole percent of the repeat units in such modified PEN will be derived from diacids or diols other than naphthalene dicarboxylic acid and ethylene glycol. It is, of course, contemplated that diesters of such dicarboxylic acids and diols can be used. In most cases, such modified PEN will contain not more than about 15 mole percent units derived from diacids other than naphthalene dicarboxylic acid and/or less than 5 mole percent units derived from diols other than ethylene glycol. It will normally be preferred for such modified polyesters to contain not more than about 10 mole percent units derived from dicarboxylic acids other than naphthalene dicarboxylic acid and/or less than 5 mole percent units derived from glycols other than ethylene glycol.

In the process of the invention, an inert gas is dispersed into the PEN prepolymer while it is in a molten state, and prior to granulation. Nitrogen is suitable for the inert gas, but other gases which would be inert to the polymer under melt polymerization conditions may also be employed. Injection of the gas at high pressure is not required, but must be sufficient to adequately disperse the gas into the molten polymer. Higher pressures require smaller injection volumes to provide a given void fraction, but also require better mixing to ensure uniform dispersion of the gas within the molten polymer. The formation of solid polymer with an excessive void fraction should be avoided. Such polymer would have insufficient density to provide cost-effective polymer production rates. Also, since the solid polymer typically passes through at least some process equipment by gravity flow, polymer with an excessive void space may be too lightweight to provide sufficient gravity flow rates, resulting in bridging and plugging in the process equipment. The foamed granules formed from the molten polymer will have a void fraction of from about 0.10 to about 0.50, preferably from about 0.15 to about 0.30, and most preferably from about 0.20 to about 0.25, to provide the advantage of enhanced solid state polymerization rates while avoiding the disadvantages associated with excessive void fraction.

To ensure uniform dispersion of the inert gas within the PEN prepolymer, it is necessary to keep the intrinsic viscosity (IV) of the PEN polymer less than about 0.60 dl/g. A PEN polymer that has reached an IV of from about 0.25 dl/g to about 0.55 dl/g will allow good dispersion of the inert gas, and have sufficient melt strength that it can be converted to granular form (e.g. pellets, cubes, etc.) for solid state polymerization. The IV of the PEN polymer is measured in a 60:40 phenol:-tetrachloroethane mixed solvent system at a temperature of 30° C. Given the very high melt viscosity of PEN polymer, and the high solid state polymerization rates possible with foamed PEN prepolymer, it may be economically advantageous to set the prepolymer product IV at the minimum level acceptable for pelletizing or dicing. This will facilitate foaming the prepolymer, and allow the polymer IV to be efficiently increased in the solid state to a level desired for the solid stated product.

The low molecular weight PEN prepolymers which are subsequently polymerized in the solid state, are generally converted to a solid form through rapid cooling and pelletizing, dicing, etc. the polymer into pellets, chips, or cubes. Such granules can vary greatly in size; however, as a general rule, the smaller the size of the granules, the faster any reaction byproducts will be driven off in the subsequent solid state polymerization.

In the devolatilization step, the amorphous PEN prepolymer is heated to a temperature within the range of about 80° C. to about 140° C. in the presence of a purge gas or under a vacuum to devolatize the amorphous PEN. This devolatilization procedure is preferably conducted at a temperature which is within the range of about 115° C. to about 137° C. It is more preferred for the devolatilization to be done at a temperature of from about 120° C. to about 135° C. The devolatilization step can be carried out as either a batch or a continuous operation.

The purge gas utilized in the devolatilization procedure can be any gas which does not react with the PEN prepolymer under devolatilization conditions. Since the PEN prepolymer is relatively stable at the devolatilization temperature, air can be used as the purge gas. It is, of course, also possible to utilize nitrogen, or a noble gas such as helium or neon in the devolatilization procedure. Even though it is possible to carry out the devolatilization step under a vacuum, it is normally preferred to carry out the devolatilization in the presence of a stream of a purge gas because the purge gas can be preheated to the devolatilization temperature to provide improved heat transfer.

The devolatilization step is carried out for a period of time which is sufficient to remove most of the volatile materials, such as water, ethylene glycol, and acetaldehyde from the PEN prepolymer. It is, of course, desirable to remove virtually all of the volatile compounds from the PEN prepolymer prior to crystallization. The amount of time required for the devolatilization step will depend upon the temperatures utilized. Higher temperatures naturally require shorter periods of time to achieve a requisite degree of devolatilization. For example, at a temperature of 115° C. the time required for devolatilization is about four hours. At a temperature of 130° C. only about two hours is required for devolatilization. The optimum period of time required for devolatilization will also be somewhat dependent upon the equipment utilized and upon the size and shape of the granules. The time required for devolatilization in a continuous process will typically be within the range of 15 minutes to 10 hours and will more typically be within the range of 30 minutes to 4 hours.

Since the devolatilization procedure is carried out at a temperature below the sticking temperature of the amorphous PEN prepolymer, agitation is not required during the devolatilization step. Accordingly, a hopper type devolatilizer can be utilized wherein the amorphous PEN prepolymer granules are continuously charged into the top of the hopper and are allowed to move through the hopper by gravity countercurrent to the flow of purge gas. The devolatilized granules leaving the bottom of the hopper devolatilizer can then be continuously fed into a crystallizer. Alternatively, devolatilization can be conducted in a horizonal vessel, with agitation to move the polymer through the vessel. In a batch operation, a tumbling vessel may be used.

Use of this devolatilization step is particularly critical when foamed PEN polymers are to be solid state polymerized. It is known that solid PEN granules will greatly expand and stick together to form an inseparable mass when directly exposed to crystallization temperatures. This phenomenon has been determined to be the result of rapid release of byproducts inside the granules at temperatures approaching the softening point of the PEN polymer and prior to significant crystallization of the polymer. By devolatilizing the solid PEN granules prior to crystallization, volatile materials trapped inside the granules are gradually removed, and agglomeration is avoided. Foamed PEN granules expand and agglomerate even more severely than solid PEN granules when exposed directly to crystallization temperatures. Since the foamed granules have a lower weight for a given size of granule, and therefore a lower density, the severe distortion of the foamed granules may be due to the greater expansion that occurs relative to a given weight of PEN. Use of a devolatilization step prior to crystallization and solid state polymerization of foamed PEN granules also appears to enhance the solid state polymerization rate for the foamed PEN granules. This may be due to fractures occurring within the granules, connecting some of the void spaces within the granules, due to expansion of the inert gas present within the foamed PEN, and to the rapid expansion of reaction byproducts, during the devolatilization step.

In the crystallization step, the devolatilized PEN prepolymer is heated to a temperature within the range of about 150° C. to about 260° C. to crystallize the polymer. When an amorphous polyester is heated significantly above its glass transition temperature ($T_g$), it will become sticky before it starts to crystallize. PEN has a $T_g$ of about 118° C., and it exhibits a crystallization peak between 180° C. and 220° C., and its sticking temperature is about 140° C. when in the amorphous state. Therefore, according to conventional wisdom, the preferred crystallization temperature range for PEN would be between 180° C. and 220° C. It is typically more preferred for the crystallization temperature to be within the range of 190° C. to 205° C.

It is important for the crystallization step to be conducted while the PEN prepolymer is being agitated to prevent sticking. The requisite degree of agitation can be provided by utilizing a crystallizer which has a fluidized or vibrating bed. In such fluidized bed crystallizers, a purge gas is typically allowed to flow through the crystallizer at a rate sufficient to maintain the prepolymer cubes or pellets in the fluidized state. It is, of course, also possible to perform the crystallization step in an agitated vessel which provides sufficient agitation so as to prevent sticking or agglomeration of the PEN prepolymer pellets or cubes.

The amount of time required for the crystallization step will depend upon the temperatures utilized. Higher temperatures naturally require shorter periods of time to achieve a requisite degree of crystallization. The optimum period of time required for crystallization will also be somewhat dependent upon the equipment utilized and the size and shape of the polymer granules. Because polyester granules entering the crystallizer in a continuous process have been preheated to near the sticking temperature, they can be heated in the crystallizer to the crystallization temperature and crystallized quickly. This leads to a shorter polymer sticky stage and more uniform granule temperature and crystallinity, and hence a more stable and efficient process. The time required for crystallization will typically be within the range of about 1 minute to about 4 hours. In a continuous process, the crystallization step will normally take about 2 minutes to about 30 minutes. The crystallization step can be carried out as either a batch or a continuous operation.

After the PEN prepolymer has been crystallized, it can be solid state polymerized in a batch or continuous process. Suitable solid state polymerization temperatures can range from a temperature just above the threshold temperature of the polymerization reaction up to a temperature within a few degrees of the sticking temperature of the PEN prepolymer which can be well below its melting point. The solid state polymerization temperature utilized will typically be from about 1° C. to about 50° C. below the sticking temperature of the crystallized PEN prepolymer. The optimum solid state reaction temperature will differ somewhat for polymers of different molecular weights, and compositions (e.g. PEN homopolymers and PEN copolymers).

As a general rule, the optimum solid state polymerization temperature for the PEN prepolymer will be from about 5° C. to about 20° C. below its sticking temperature. For example, in the solid state polymerization of crystalline PEN, the temperature employed normally ranges from about 210° C. to about 265° C. Generally, the crystalline PEN prepolymer will be solid state polymerized at a temperature of from about 230° C to about 265° C. In most cases, PEN prepolymer will be solid state polymerized at a temperature of from 240° C. to 260° C.

The solid state polymerization is conducted under a vacuum or, more typically, in the presence of a stream of an inert gas. It is highly desirable for the inert gas to flow uniformly throughout the solid state polymerization zone which is filled with the polyester prepolymer which is being polymerized. A good polymerization reactor will be designed in such a way that the inert gas will flow evenly through the polyester prepolymer in it. It should be noted that the inert gas actually flows around the polyester prepolymer granules as it streams through the solid state polymerization zone. Some suitable inert gases for use in the solid state polymerization process of this invention include nitrogen, carbon dioxide, helium, argon, neon, krypton, zeon, and certain industrial waste gases. Various combinations or mixtures of different inert gases can also be used. In most cases nitrogen will be used as the inert gas.

The PEN prepolymer is solid state polymerized for a time sufficient to increase its molecular weight or IV to that of the high molecular weight PEN resin desired. It is desirable for the high molecular weight PEN resin being prepared to have an IV of at least 0.5 dl/g. In most cases the high molecular weight resin will have an IV of at least about 0.65 dl/g and for some applications will preferably have an IV of at least about 0.75 dl/g. The polymerization time needed will normally range from about 1 to about 24 hours and in most cases will range from 4 to 14 hours.

Use of foamed PEN prepolymer allows use of a lower solid state polymerization temperature to achieve the same target IV for the solid stated product, with the same solid state polymerization time. While the melting point temperature ($T_m$) of PET is affected only slightly by the solid state polymerization temperature used, we have found that the melting point temperature ($T_m$) for solid stated PEN polymer in general increases about 5° C. to 10° C. with every 10° C. increase in solid state polymerization temperature. With foamed PEN prepolymer, it is therefore possible to produce high molecular weight solid stated PEN resins (e.g. IV of 0.70 dl/g) with lower melting points (e.g. less than 270° C.), by using lower solid state polymerization temperatures (e.g. 240° C.) with reasonable solid state polymerization times (e.g. less than 6 hours). Use of lower temperatures for solid state polymerization may also allow use of equipment designed to solid state polymerize PET polymer, which is typically solid state polymerized at less than 230° C., to solid state polymerize PEN polymer.

Production of a solid state polymerized PEN polymer with a lower $T_m$ also provides a benefit during subsequent processing of the polymer into articles such as bottles. We have found that the acetaldehyde generation rate doubles for every 15° C. increase in polymer processing temperature for PEN. Consequently, a PEN polymer with a lower $T_m$ may be processed at a lower processing temperature into articles such as bottles that contain a lower acetaldehyde content. Polymers with lower $T_m$ are also generally easier to process into finished articles. Low acetaldehyde content is particularly important for some finished articles, such as mineral water bottles.

The unexpectedly great effect of foaming of prepolymer granules on the solid state polymerization rate for PEN polymer may be attributed to several factors. Because of the higher barrier property of PEN polymer, a greater reduction in the diffusional resistance can be achieved by foaming. Amorphous PEN polymer is quite brittle, consequently, dicing or pelletizing tends to crack open the cells within the foamed cubes or pellets. In addition, the relatively large amounts of byproducts trapped inside the foamed PEN cubes may open up the cells as they escape from within the granules during devolatilization.

This invention is illustrated by the following examples which are merely for the purpose of illustration and are not to be regarded as limiting the scope of the invention or the manner in which it can be practiced.

EXAMPLE 1

Foamed and unfoamed PEN prepolymers with a target IV of 0.50 dl/g in the form of ⅛ inch cubes were prepared and solid state polymerized at three temperatures (240° C., 250° C. and 260° C.) to compare their solid state polymerization rates.

The last stage of the melt state polymerization used to prepare the prepolymer is normally conducted under vacuum. When the desired prepolymer IV is reached, the reactor is pressurized to about 45 psig with nitrogen, and the molten prepolymer is extruded and pressed into a ⅛ inch ribbon. The ribbon is solidified by quenching with cold water, and then diced into ⅛ inch cubes. In the normal production of standard solid prepolymer cubes, the agitation is stopped before the reactor is pressurized. To produce foamed cubes for this example, the agitation was kept running during pressurizing to whip nitrogen into the prepolymer melt. Depending on the speed and duration of the agitation after the completion of the melt state polymerization and the final reactor pressure used, foamed cubes with various porosities can be obtained. One batch each of solid and foamed PEN prepolymer cubes were produced for this example. The IV's of the solid and foamed PEN prepolymers were 0.500 dl/g and 0.497 dl/g respectively. The bulk density of the foamed PEN cubes was 79.4% of that of the solid PEN cubes. Therefore, the void fraction of the foamed PEN cubes was about 0.21.

A glass, tube-shaped reactor, 1 inch in diameter and 20 inches in length, was used to conduct the solid state polymerization experiments. During the solid state polymerization experiments, the reactor was immersed in a thermostatted oil bath, and a stream of nitrogen, preheated to the reactor temperature, was passed through the bottom of the reactor to sweep away the reaction byproducts. In each solid state polymerization run, 80 grams of PEN prepolymer cubes were charged to the reactor.

In the standard procedure for solid state polymerization of PET, the PET prepolymer granules are directly exposed to the crystallization temperature (160° C. to 200° C.) to effect crystallization. However, when either foamed or solid PEN prepolymer cubes were directly exposed to the crystallization temperature (170° C. to 220° C.), the cubes expanded greatly and stuck together to form lumps, which were very difficult to separate, as the polymer temperature reached the softening point before significant crystallization took place. This phenomenon has been determined to be due to the sudden volatilization of byproducts (water, ethylene glycol, and acetaldehyde, etc.) trapped inside the PEN cubes near the softening point. In the case of foamed cubes, the nitrogen or other inert gas remaining in the voids within the cubes also contributes to the sudden expansion and worsens the sticking problem. To circumvent this problem, the PEN prepolymer was devolatilized at 125° C., which is below the softening point of amorphous PEN, in a stream of nitrogen for 2 hours before the crystallization step, to slowly remove most of the trapped byproducts. Then the prepolymer was crystallized and further dried at 200° C. for 60 minutes. With this devolatilization step, no sudden expansion and sticking were encountered. The reactor temperature was then raised to the desired reaction temperature (240° C., 250° C., or 260° C.) to effect the solid state polymerization which lasted for 23 to 24 hours. Solid state polymerization runs, each with a different reaction temperature (240° C., 250° C., or 260° C.) were conducted for each of the foamed and, for comparison, unfoamed PEN prepolymers. The IV's of the foamed and unfoamed PEN samples taken at various periods of solid state polymerization time during the six solid state polymerization runs are listed in Table 1.

For comparison, the solid PEN prepolymer was also used to prepare porous pellets for a solid state polymerization test. Samples of solid PEN cubes were ground in a Wiley mill through a 60 mesh screen. The powder obtained was screened with a 100 mesh sieve. The fraction retained on the 100 mesh sieve was used to prepare porous pellets with a Parr Pellet Press using a ⅛ inch die and 1200 pounds per square inch (psi) pressure. The resulting porous pellets were ⅛ inch in diameter and 3/16 inch in length. The bulk density of the PEN porous pellets was 85% of that of the PEN solid cubes. Because of the high rigidity and low tackiness of amorphous PEN, the durability of the porous pellets was poor. The PEN porous pellets thus obtained were solid state polymerized using the same procedure given above. Only one solid state polymerization run with a reaction temperature of 250° C. was conducted for the porous pellets. Because the porous pellets solid state polymerized very rapidly, the reaction was terminated after 7.5 hours. At the end of the solid state polymerization, PEN fines, weighing about 17% of the total weight of the PEN porous pellets charged, were recovered from the bottom of the reactor tube. These fines arose as a result of partial disintegration of the porous pellets during the experimental run. This could be a serious problem considering that disturbance of the porous pellet bed during the experimental run was kept to a minimum. In a commercial solid state polymerization process, which requires vigorous agitation at least during the crystallization step, a major fraction of the mass of the PEN porous pellets will fail off to generate a large amount of fines. The PEN porous pellet samples taken during the solid state polymerization run were also tested for IV. The results are included in Table 1. Because the IV data for the solid state polymerization of PEN porous pellets appeared to scatter more than for PEN solid and foamed cubes, duplicate IV tests were performed for each solid stated PEN porous pellet samples.

For comparison, foamed and unfoamed PET prepolymer cubes with a target IV of 0.58 dl/g were produced by methods similar to those used for the PEN prepolymers. The bulk density of the foamed PET cubes was 88% of that of the unfoamed PET cubes. Therefore the void fraction of the foamed PET cubes was estimated to be 0.12. Samples of these PET prepolymers were also solid state polymerized using a standard procedure normally used for PET. No devolatilization step was required for the PET prepolymers. The PET prepolymer was first crystallized and dried at 180° C. for 60 minutes, and then the reactor temperature was raised to 220° C. to effect the solid state polymerization, which lasted for 24 hours. Only one solid state polymerization was conducted for each PET prepolymer. Samples taken at different periods of solid state polymerization time were tested for IV. Table 2 lists the IV's of the foamed and unfoamed PET samples taken during the solid state polymerization runs.

The IV data in Tables 1 and 2 can be used to prepare polymer IV vs solid state polymerization (SSP) time plots for all the SSP runs conducted for the PEN and PET prepolymers. From these plots, the SSP times required for the PEN prepolymers to achieve 0.70 and 0.80 dl/g IV's at 240° C., 250° C., and 260° C. and the SSP times required for the PET prepolymers to achieve 0.80 dl/g and 0.95 dl/g IV's at 220° C. can be determined. The SSP time requirements thus determined are listed in Table 3.

From these SSP time requirement data, the SSP rate advantages of foamed PEN over unfoamed PEN and foamed PET over unfoamed PET can be calculated for each product IV at each SSP temperature. For example, the SSP times required for the foamed and unfoamed PEN to achieve a product IV of 0.80 dl/g were 5.1 hours and 23.0 hours respectively at 250° C. Thus the foamed PEN solid state polymerized 4.51 times as fast as unfoamed PEN and the SSP rate advantage of foamed PEN was 351% over unfoamed PEN. The SSP rate advantage data thus determined are also included in Table 3 for the foamed and unfoamed PET. Since the productivity of a solid state polymerization reactor is measured in terms of polymer weight per hours, it is necessary to factor in the lower bulk densities of the foamed PEN and PET (compared with the unfoamed PEN and PET respectively) to determine the SSP productivity advantages. The SSP productivity advantages of foamed PEN over unfoamed PEN and foamed PET over unfoamed PET thus obtained are also included in Table 3. Similarly, the rate and productivity advantages of PEN porous pellets over foamed and unfoamed PEN were determined and their values are also included in Table 3.

It can be seen in Table 3 that the foamed PEN solid state polymerized from about 4 times (in the IV range of 0.50–0.70 dl/g at 240° C.) to about 4.5 times (in the IV range of 0.50–0.80 dl/g at 250° C.) as fast as the unfoamed PEN. Adjusted for its lower bulk density, foamed PEN offered productivity advantages of at least 200% over unfoamed PEN. These exceptionally high SSP rate and productivity advantages of foamed PEN prepolymer were unexpected based on the modest SSP rate and productivity advantages of foamed PET prepolymer over unfoamed PET prepolymer.

In comparison, it can be seen in Table 3 that the foamed PET had SSP rate advantages of only 20.3% and 32.0% for products of IV's of 0.80 dl/g(for bottle application) and 0.95 dl/g (for frozen food tray application) respectively. Adjusted for its lower bulk density, the foamed PET had SSP productivity advantages of 5.9% and 16.2% respectively over the unfoamed PET. While these advantages are significant, they are quite low compared with that of foamed PEN over unfoamed PEN.

These observations may be explained by the following two reasons: First, PEN has a much higher barrier property than PET and the SSP of PEN is more diffusionally controlled than the SSP of PET. Therefore, any measure that contributes to a reduction in diffusional resistance (e.g. foaming) will result in a greater increase in the SSP rate. Secondly, during the devolatilization step, the release of the relatively large amounts of byproducts as well as nitrogen trapped inside the foamed PEN granules opened up the cells or voids, thereby greatly enhancing the diffusion rates of the reaction byproducts and the overall SSP ram during solid state polymerization. Although porous PEN pellets also offered a significant SSP rate advantage, it is impractical to produce high IV PEN via porous pellets because of pellet durability problems.

Besides significant improvements in SSP rate and productivity, the use of foamed PEN prepolymer instead of standard unfoamed PEN prepolymer offers another advantage; namely, it facilitates economical production of solid stated PEN resins with substantially lower melting points. Low melting PEN resin is particularly suitable for applications, such as soft drink bottles and food containers, where low acetaldehyde content is important.

The melting point of solid stated PEN is primarily a function of SSP time and temperature-molecular weight or IV has very little effect on the melting point. The effects of SSP time and temperature on the melting point of PEN are much greater than on PET and are of particular interest here. At a fixed SSP temperature, the melting point of PEN at first decreases with the SSP time and reaches a minimum, and then increases monotonously as the SSP is continued until it reaches an equilibrium value. Thus, at an SSP temperature of 240° C., the melting point of PEN decreases from about 268° C. to a minimum value of about 264.5° C. in about 6 hours, and then increases monotonously as the SSP is continued. At an SSP temperature of 250° C. or higher, the melting point reaches the minimum within 30 minutes and the minimum value is only slightly lower than the initial value. In general, the melting point of PEN after a fixed SSP time increases by 5° C. to 10° C. for each 10° C. increase in the SSP temperature. Therefore, based on the SSP time required and the SSP temperature used, the melting point of each of the solid stated PET and PEN products listed in Table 3, regardless of its form, can be estimated with reasonable accuracy. The estimated melting point of each solid stated product is also included in Table 3.

EXAMPLE 2

The following is an example that demonstrates how a solid stated PEN product with a substantially lower melting point can be produced with a reasonably short SSP time by using foamed prepolymer instead of unfoamed prepolymer.

The maximum safe temperature for a continuous solid state polymerization of PEN in a moving-bed reactor is about 250° C. To produce 0.70 dl/g IV solid PEN cubes for bottle application at a reactor temperature of 250° C., a residence time of 12.3 hours is required. This solid stated PEN bottle resin will have a melting point of 277.8° C. (see Table 3). Although it may be feasible to produce 0.70 dl/g IV solid PEN with a significantly lower melting point (271.0° C.) by using a lower reactor temperature of 240° C., the much longer residence time required (22.0 hours) will make the process less economical. If foamed PEN prepolymer is used in place of the standard unfoamed PEN prepolymer, 0.70 dl/g IV solid stated product with a melting point of 264.5° C. can be produced with a relatively short residence time of 5.6 hours at a reactor temperature of 240° C. Not only is the product melting point about 13° C. lower, but also the solid stating residence time is about 47% shorter than for the standard process using unfoamed prepolymer and a reactor temperature of 250° C.

Solid stated PEN with a lower melting point not only is easier to process, but also allows use of a lower melt processing temperature yielding end products with a lower acetaldehyde content. We have determined that the acetaldehyde generation rate of PEN in its melting-processing temperature range approximately doubles for each 15° C. increase in temperature. We have further determined that over 95 % of the acetaldehyde content of the PEN bottle preforms is contributed by the acetaldehyde generated during the injection molding step. It will be reasonable to assume that foamed PEN bottle resin with a melting point of 13° C. lower than the standard solid PEN bottle resin can be injection molded at a barrel temperature of about 13° C. lower than the standard barrel temperature, yielding preforms with at least 40% lower acetaldehyde content. Consequently, foamed PEN polymer can provide finished articles with significantly lower acetaldehyde content. Because of this property advantage, and the enhanced SSP rates possible, we believe that among the three forms of PEN prepolymers, foamed granulate is the preferred form for use in solid state polymerization.

TABLE 1

Intrinsic Viscosity of Foamed and Solid PEN and Porous PEN Samples Taken at Various Times During Solid State Polymerization (SSP) at Various Temperatures

| Prepolymer Form | Reaction Time (hours) | Intrinsic Viscosity (dl/g) Reaction Temperature | | |
|---|---|---|---|---|
| | | 240° C. | 250° C. | 260° C. |
| Foamed Cubes | 0 | 0.500 | 0.500 | 0.500 |
| | 1.0 | 0.551 | 0.579 | 0.637 |
| | 2.5 | 0.610 | 0.675 | 0.767 |
| | 4.5 | 0.667 | 0.775 | 0.911 |
| | 7.5 | 0.738 | 0.890 | 1.069 |
| | 11.0 | 0.811 | 0.990 | 1.175 |
| | 15.0 | 0.862 | 1.071 | 1.249 |
| | 19.0 | 0.923 | 1.126 | 1.287 |
| | 24.0 | 0.978 | 1.172 | 1.353 |
| Solid Cubes | 0 | 0.497 | 0.497 | 0.497 |
| | 1.0 | 0.514 | 0.525 | 0.558 |
| | 2.75 | 0.539 | 0.554 | 0.612 |
| | 4.5 | 0.566 | 0.601 | 0.664 |
| | 7.5 | 0.591 | 0.640 | 0.727 |
| | 12.0 | 0.640 | 0.700 | 0.784 |
| | 17.0 | 0.665 | 0.724 | 0.864 |
| | 23.0 | 0.714 | 0.789 | 0.896 |
| Porous Pellets | 0 | | 0.497 | |
| | 1.0 | | 0.779 | |
| | 1.0 | | 0.797 | |
| | 2.5 | | 0.921 | |
| | 2.5 | | 0.934 | |
| | 4.75 | | 1.014 | |
| | 4.75 | | 1.045 | |
| | 7.5 | | 1.258 | |
| | 7.5 | | 1.188 | |

TABLE 2

Intrinsic Viscosities of Solid and Foamed PET Samples Taken During Solid State Polymerization at 220° C.

| Reaction Time (hours) | Intrinsic Viscosity (dl/g) | |
|---|---|---|
| | Foamed PET | Solid PET |
| 0 | 0.579 | 0.580 |
| 1 | 0.630 | 0.617 |
| 2.5 | 0.667 | 0.670 |
| 4 | 0.727 | 0.717 |
| 6 | 0.789 | 0.762 |
| 9 | 0.864 | 0.826 |
| 12 | 0.934 | 0.880 |
| 18 | 1.040 | 0.963 |
| 21 | 1.087 | 0.999 |
| 24 | 1.134 | 1.031 |

TABLE 3

Comparison of Solid State Polymerization of PEN and PET in Various Prepolymer Forms

| Prepolymer Form | SSP Temperature | 220° C. | | 240° C. | | 250° C. | | 260° C. | |
|---|---|---|---|---|---|---|---|---|---|
| | Product IV (dl/g) | 0.80 | 0.95 | 0.70 | 0.80 | 0.70 | 0.80 | 0.70 | 0.80 |
| PEN Foamed Cubes | SSP Time Required (hrs.) | | | 5.6 | 10.5 | 3.0 | 5.1 | 1.6 | 2.8 |
| | Product T$_m$ (°C.) | | | 264.5 | 267.5 | 269.5 | 272.0 | 273.5 | 275.5 |
| | SSP Rate Advantage over Solid PEN (%) | | | 293 | — | 310 | 351 | 294 | 329 |
| | Productivity Advantage over Solid PEN (%) | | | 212 | — | 214 | 258 | 213 | 249 |
| PEN Solid Cubes | SSP Time Required (hrs.) | | | 22.0 | | 12.3 | 23.0 | 6.3 | 12.3 |
| | Product T$_m$ (°C.) | | | 271.0 | | 277.8 | 281.0 | 279.5 | 283.3 |
| PET Solid Cubes | SSP Time Required (hrs.) | 7.7 | 16.9 | | | | | | |
| | Product T$_m$ (°C.) | 252.3 | 246.5 | | | | | | |
| PET Foamed Cubes | SSP Time Required (hrs.) | 6.4 | 12.8 | | | | | | |
| | Product T$_m$ (°C.) | 252.4 | 245.0 | | | | | | |
| | SSP Rate Advantage over Solid PET (%) | 20.3 | 32.0 | | | | | | |
| | Productivity Advantage over Solid PET (%) | 5.9 | 16.2 | | | | | | |
| PEN Porous Pellets | SSP Time Required (hrs.) | | | | | 0.65 | 1.3 | | |
| | Product T$_m$ (°C.) | | | | | | | | |
| | SSP Rate Advantage over Solid PEN (%) | | | | | 1790 | 1670 | | |
| | SSP Rate Advantage over Foamed PEN (%) | | | | | 362 | 292 | | |
| | Productivity Advantage over Solid PEN (%) | | | | | 1510 | 1405 | | |

TABLE 3-continued

| | Comparison of Solid State Polymerization of PEN and PET in Various Prepolymer Forms | | | | | | | | |
|---|---|---|---|---|---|---|---|---|---|
| Prepolymer | SSP Temperature | 220° C. | | 240° C. | | 250° C. | | 260° C. | |
| Form | Product IV (dl/g) | 0.80 | 0.95 | 0.70 | 0.80 | 0.70 | 0.80 | 0.70 | 0.80 |
| | Productivity Advantage over Foamed PEN (%) | | | | | 394 | | 320 | |

I claim:

1. A process for making a high molecular weight solid state polymerized poly(ethylene naphthalate) polymer comprising:
preparing a molten poly(ethylene naphthalate) polymer with an intrinsic viscosity of from about 0.25 dl/g to about 0.55 dl/g;
dispersing an inert gas into the molten poly(ethylene naphthalate) polymer to form a foamed poly(ethylene naphthalate) polymer with a void fraction of from about 0.10 to about 0.50;
forming the foamed poly(ethylene naphthalate) polymer into granules suitable for solid state polymerization;
devolatilizing the granular poly(ethylene naphthalate) polymer at a temperature of from about 80° C. to about 140° C.;
crystallizing the devolatilized poly(ethylene naphthalate) polymer at a temperature of from about 150° C. to about 260° C.;
solid state polymerizing the crystallized poly(ethylene naphthalate) polymer at a temperature of from about 210° C. to about 265° C. to form a solid state polymerized poly(ethylene naphthalate) polymer product.

2. The process of claim 1 wherein the molten poly(ethylene naphthalate) polymer has an intrinsic viscosity of from about 0.25 dl/g to about 0.45 dl/g.

3. The process of claim 2 wherein the inert gas is nitrogen.

4. The process of claim 3 wherein the foamed poly(ethylene naphthalate) polymer has a void fraction of from about 0.15 to about 0.30.

5. The process of claim 3 wherein the foamed poly(ethylene naphthalate) polymer has a void fraction of from about 0.20 to about 0.25.

6. The process of claim 3 wherein the foamed poly(ethylene naphthalate) polymer is formed into foamed cubes for solid state polymerization.

7. The process of claim 3 wherein the foamed poly(ethylene naphthalate) polymer is formed into foamed pellets for solid state polymerization.

8. The process of claim 3 wherein the poly(ethylene naphthalate) polymer is devolatilized at a temperature of from about 120° C. to about 130° C.

9. The process of claim 3 wherein the poly(ethylene naphthalate) polymer is crystallized at a temperature of from about 190° C. to about 205° C.

10. The process of claim 3 wherein the poly(ethylene naphthalate) polymer is solid state polymerized at a temperature of from about 230° C. to about 265° C.

11. The process of claim 1 wherein the poly(ethylene naphthalate) is a poly(ethylene naphthalate) homopolymer.

12. The process of claim 1 wherein the poly(ethylene naphthalate) is a poly(ethylene naphthalate) copolymer.

13. The process of claim 12 wherein the poly(ethylene naphthalate) contains no more than about 20 mole percent repeat units derived from terephthalic acid.

14. The process of claim 9 wherein the poly(ethylene naphthalate) polymer is solid state polymerized at a temperature of 240° C. or more, and the solid state polymerized poly(ethylene naphthalate) polymer has a product IV of at least 0.70 dl/g and a melting point of less than 270° C.

15. The process of claim 9 wherein the poly(ethylene naphthalate) polymer is solid state polymerized at a temperature of 250° C. or more, and the solid state polymerized poly(ethylene naphthalate) polymer has a product IV of at least 0.70 dl/g and a melting point of less than 275° C.

16. The process of claim 9 wherein the poly(ethylene naphthalate) polymer is solid state polymerized at a temperature of 260° C. or more, and the solid state polymerized poly(ethylene naphthalate) polymer has a product IV of at least 0.70 dl/g and a melting point of less than 278° C.

* * * * *